(12) United States Patent
Yin et al.

(10) Patent No.: US 10,664,110 B2
(45) Date of Patent: May 26, 2020

(54) TOUCH PANEL CONTROLLER, CONTROL INFORMATION ACQUISITION METHOD, AND STORAGE MEDIUM

(71) Applicant: BOE Technology Group Co., Ltd., Beijing (CN)

(72) Inventors: Guobing Yin, Beijing (CN); Min Peng, Beijing (CN); Jiyang Shao, Beijing (CN); Xingdong Liu, Beijing (CN); Yuting Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/986,881

(22) Filed: May 23, 2018

(65) Prior Publication Data
US 2019/0004627 A1  Jan. 3, 2019

(30) Foreign Application Priority Data
Jul. 3, 2017 (CN) .......................... 2017 1 0533693

(51) Int. Cl.
*G06F 3/044* (2006.01)
*G06F 3/041* (2006.01)

(52) U.S. Cl.
CPC ............ *G06F 3/044* (2013.01); *G06F 3/0412* (2013.01)

(58) Field of Classification Search
CPC ......... G06F 3/0488; G06F 2203/04104; G06F 2203/04809; G06F 3/016; G06F 3/041; G06F 3/0412; G06F 3/0416
See application file for complete search history.

(56) References Cited

U.S. PATENT DOCUMENTS

| | | | |
|---|---|---|---|
| 9,229,548 B2* | 1/2016 | Thompson | G06F 3/039 |
| 2009/0066670 A1* | 3/2009 | Hotelling | G06F 3/0416 |
| | | | 345/174 |
| 2014/0253445 A1* | 9/2014 | Petersen | G06F 3/033 |
| | | | 345/161 |
| 2018/0120967 A1* | 5/2018 | Ballan | G06F 3/03549 |

* cited by examiner

*Primary Examiner* — Koosha Sharifi-Tafreshi
(74) *Attorney, Agent, or Firm* — Fay Sharpe LLP

(57) ABSTRACT

The present disclosure relates to a touch panel controller, a control information acquisition method and a touch display device in the field of display technology. The touch panel controller includes at least two conductive members and a rotating component. The rotating component includes a supporting component and a mounting component connected to each other. The mounting component is configured to have the at least two conductive members mounted thereon. One end of the supporting component is configured to determine a placement surface that is in contact with a touch panel. A distance between each of the at least two conductive members and the placement surface is less than a sensing distance, and the sensing distance is a distance at which a capacitance change caused by the conductive member is detectable by the touch panel. In the present disclosure, a plurality of rotatable conductive members in the controller are used to input a multi-point touch operation such as rotation or multi-point sliding, which solves the problem in the related art that it is difficult for the stylus to accomplish multi-point touch operations and achieves an effect of performing a variety of multi-point touch operations through the controller.

18 Claims, 6 Drawing Sheets

TOUCH PANEL CONTROLLER, CONTROL INFORMATION ACQUISITION METHOD, AND STORAGE MEDIUM

This application claims priority to Chinese Patent Application No. 201710533693.4, filed with the State Intellectual Property Office on Jul. 3, 2017 and titled "TOUCH PANEL CONTROLLER, CONTROL INFORMATION ACQUISITION METHOD, AND TOUCH DISPLAY DEVICE," the entire contents of which are incorporated herein by reference.

TECHNICAL FIELD

The present disclosure relates to display technologies, and more particularly to a touch display controller, a control information acquisition method and a storage medium.

BACKGROUND

The capacitive touch panel is currently a mainstream touch panel. The touch panel has numerous advantages such as high wear resistance, long service life, and almost no correction.

In the related art, a controller for a capacitive touch panel is a stylus. The stylus comprises a pen holder and a pen tip at one end of the pen holder. The pen tip is made of a conductive material. A user holds the stylus. When the pen tip slides on a touch surface of the touch panel, the capacitance on the touch panel changes. The touch panel may recognize the track of the pen tip on the touch surface in accordance with the capacitance change, thereby realizing a touch function.

In the process of implementing the present disclosure, the inventors found that the related art has at least the following problem: it is difficult for the stylus to complete a multi-point touch operation.

SUMMARY

The present disclosure provides a touch panel controller, a control information acquisition method and a storage medium, capable of solving the problem that it is difficult for the stylus to complete a multi-point touch operation in the related art. The technical solutions are as follows:

In a first aspect of the present disclosure, there is provided a touch panel controller, including: at least two conductive members and a rotating component.

The rotating component includes a supporting component and a mounting component connected to each other. The mounting component is configured to have the at least two conductive members mounted thereon, and the at least two conductive members are movable circularly round an axis of the rotating component under the drive of the rotating component.

One end of the supporting component is configured to determine a placement surface that is in contact with a touch panel. The distance between each of the at least two conductive members and the placement surface is less than a sensing distance, and the sensing distance is a distance at which a capacitance change caused by the conductive member is detectable by the touch panel.

In some embodiments, the orthogonal projections of the at least two conductive members on the placement surface are at least two point projections, and a preset pattern is formable with the at least two point projections as vertices.

In some embodiments, the number of the at least two conductive members is three, the preset pattern is an equilateral triangle, and a side length of the equilateral triangle is a first preset length.

In some embodiments, the number of the at least two conductive members is six, the preset pattern is a regular hexagon, and a side length of the regular hexagon is a second preset length.

In some embodiments, when the placement surface is in coplanar contact with a touch surface of the touch panel, each of the at least two conductive members is in contact with the touch surface, and the at least two conductive members are capable of rolling on the touch surface when moving circularly under the drive of the rotating component.

In some embodiments, any one of the at least two conductive members has a spherical shape, a cylindrical shape, a circular truncated cone shape, or a conical shape.

In some embodiments, each of the at least two conductive members is spherical.

The mounting component includes a mounting plate. At least two mounting holes are in the mounting plate, and the at least two conductive members are installed in the at least two mounting holes respectively.

The supporting component includes a supporting plate. An annular through hole is in the supporting plate. A plate surface of the supporting plate is the placement surface, and the at least two conductive members are capable of rolling on the touch surface through the annular through hole when moving circularly.

In some embodiments, the mounting plate is a circular mounting plate.

The mounting component further includes a rotating housing fixedly connected to the mounting plate. The rotating housing includes a cylindrical outer wall and a top cover. The cylindrical outer wall surrounds the mounting plate, an axis of the cylindrical outer wall is parallel to an axis of the mounting plate, and the top cover is disposed at an opening at one end of the cylindrical outer wall for sealing the opening.

In some embodiments, the diameter of each of the at least two conductive members is greater than or equal to 3 mm, and the distance between any two conductive members is greater than or equal to 3 mm.

In some embodiments, the number of the at least two conductive members is less than or equal to the number of touch points that the touch panel may identify.

In some embodiments, the supporting component and the mounting component are rotatably connected.

The maximum static friction force between the supporting component and the touch surface of the touch panel is greater than the maximum static friction force between the supporting component and the mounting component.

In a second aspect of the present disclosure, there is provided a control information acquisition method for a touch panel controlled by a touch panel controller. The method includes: acquiring movement tracks of the at least two conductive members of the touch panel controller on a touch surface of the touch panel; and acquiring control information corresponding to the movement tracks according to a preset correlation.

In some embodiments, the orthogonal projections of the at least two conductive members on the placement surface are at least two point projections, and a preset pattern is formable with the at least two point projections as vertices.

Before acquiring the movement tracks of the at least two conductive members of the touch panel controller on the touch surface of the touch panel, the method further includes: determining whether patterns formed with touch points on the touch surface as a vertex comprises the preset pattern; and determining that the touch panel controller exists on the touch surface when the patterns formed with the touch points on the touch surface as the vertex comprise the preset pattern.

In a third aspect of the present disclosure, there is provided a touch display device including a touch display panel and the touch panel controller in the first aspect. The touch display device includes a touch panel.

In a fourth aspect of the present disclosure, there is provided a computer-readable storage medium that, when instructions stored in the computer-readable storage medium are executed by a processing component, cause the processing component to perform the control information acquisition method in the second aspect.

The technical solutions provided by the present disclosure may include the following advantageous benefits.

A multi-point touch operation such as rotation or multi-point sliding is input through a plurality of rotatable conductive members in the controller, which solves the problem in the related art that it is difficult for the stylus to accomplish multi-point touch operations and achieves an effect of performing a variety of multi-point touch operations through the controller.

BRIEF DESCRIPTION OF THE DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

The specific embodiments of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referring to specific embodiments.

DETAILED DESCRIPTION OF THE EMBODIMENTS

The present disclosure will be described in further detail with reference to the enclosed drawings, to dearly present the objects, technique solutions, and advantages of the present disclosure.

Figure 1:
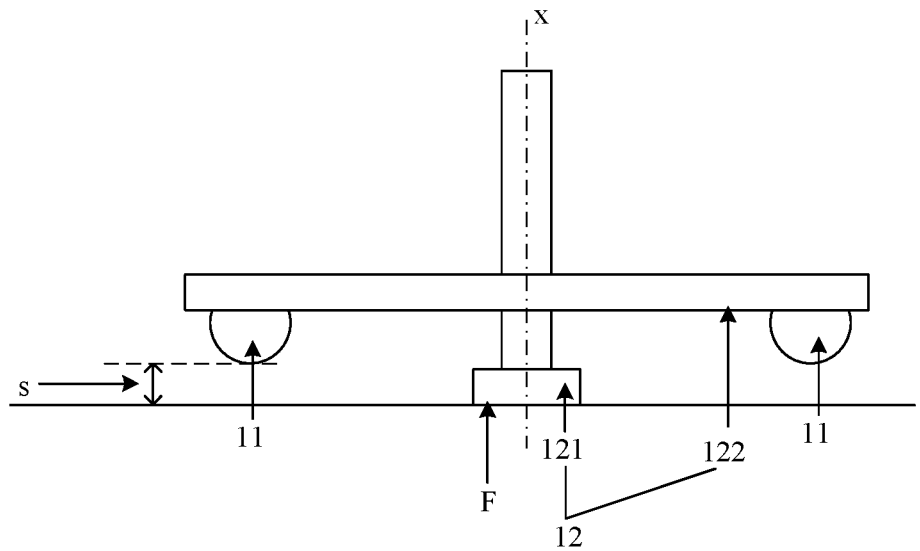
FIG. 1 is a structural diagram of a touch panel controller shown in an embodiment of the present disclosure.

FIG. 1 is a structural diagram of a touch panel controller shown in an embodiment of the present disclosure. The touch panel controller may include: at least two conductive members 11 and a rotating component 12.

The rotating component 12 includes a supporting component 121 and a mounting component 122 connected to each other. The mounting component 12 is configured to install the at least two conductive members 11, and the at least two conductive members 11 are movable circularly round the axis of the rotating component under 12 the drive of the rotating component 12.

One end of the supporting component 121 is configured to determine a placement surface F that is in contact with the touch panel. The distance s between each of the at least two conductive members 11 and the placement surface F is less than a sensing distance. The sensing distance is the distance at which the touch panel may detect a capacitance change caused by the conductive member. The placement surface determined by one end of the supporting component may be a virtual surface or a solid surface. For example, one end of the supporting component may include a flat plate, and the placement surface may be a solid surface determined by the flat plate. Alternatively, one end of the supporting component may include at least two edges, and the placement surface may be a virtual surface defined by the at least two edges. Alternatively, one end of the supporting component may include at least three endpoints, and the placement surface may be a virtual surface defined by the at least three endpoints.

In summary, the touch panel controller provided in the embodiment of the present disclosure uses a plurality of rotatable conductive members in the controller to input a multi-point touch operation such as rotation or multi-point sliding, which solves the problem in the related art that it is difficult for the stylus to accomplish multi-point touch operations and achieves an effect of performing a variety of multi-point touch operations through the controller.

Figure 2:
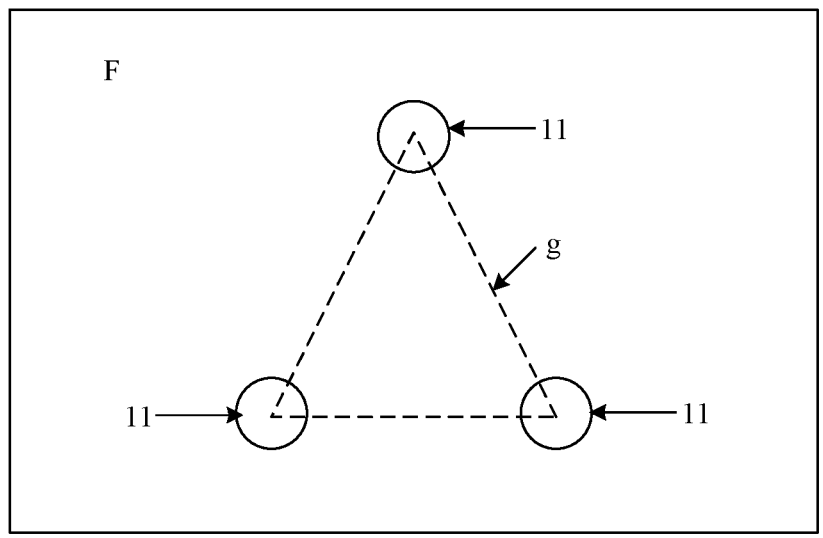
FIG. 2 is a structural diagram of another touch panel controller shown in an embodiment of the present disclosure.

Further, referring to FIG. 2, which shows a structural diagram of another touch panel controller provided in an embodiment of the present disclosure. The touch panel controller is added with components based on the touch panel controller shown in FIG. 1, so that the touch panel controller provided in the embodiment of the present disclosure has better performance.

Figure 3:
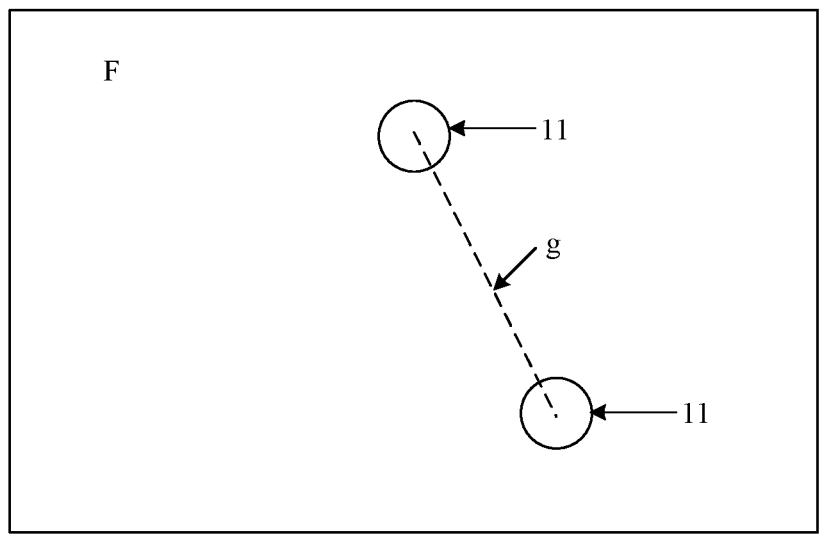
FIG. 3 is a structural diagram of an arrangement of a conductive member shown in FIG. 2.

In some embodiments, when each conductive member 11 is taken as a point, the orthogonal projections of the at least two conductive members 11 on the placement surface F are at least two point projections. The at least two point projections may be taken as vertices to form a preset pattern. The projection of the center of gravity of each conductive member on the placement surface F may be taken as the projection of the conductive member on the placement surface F. As shown in FIG. 3, there are two conductive members 11, the preset pattern may be a segment of a fixed length.

The touch panel may determine whether the touch panel controller provided in the embodiment of the present disclosure is located on the touch panel in accordance with whether the detected touch points may be combined into the preset pattern. For example, when the orthogonal projections of the conductive members on the placement surface forms the preset pattern, the touch panel determines that the touch panel controller is located on the touch panel.

In some embodiments, the number of the at least two conductive members 11 is three. The preset pattern g is an equilateral triangle. The side length of the equilateral triangle is a first preset length. FIG. 2 shows the case where the number of conductive members 11 is three. When the number of the conductive members is three and the conductive members are arranged to be the preset pattern, the probability that the touch panel incorrectly determines other touch points as the touch panel controllers provided in the embodiment of the present disclosure may be reduced.

In some embodiments, the material of the at least two conductive members 11 may include at least one of metal, conductive rubber, conductive glass, and conductive plastic.

Figure 4:
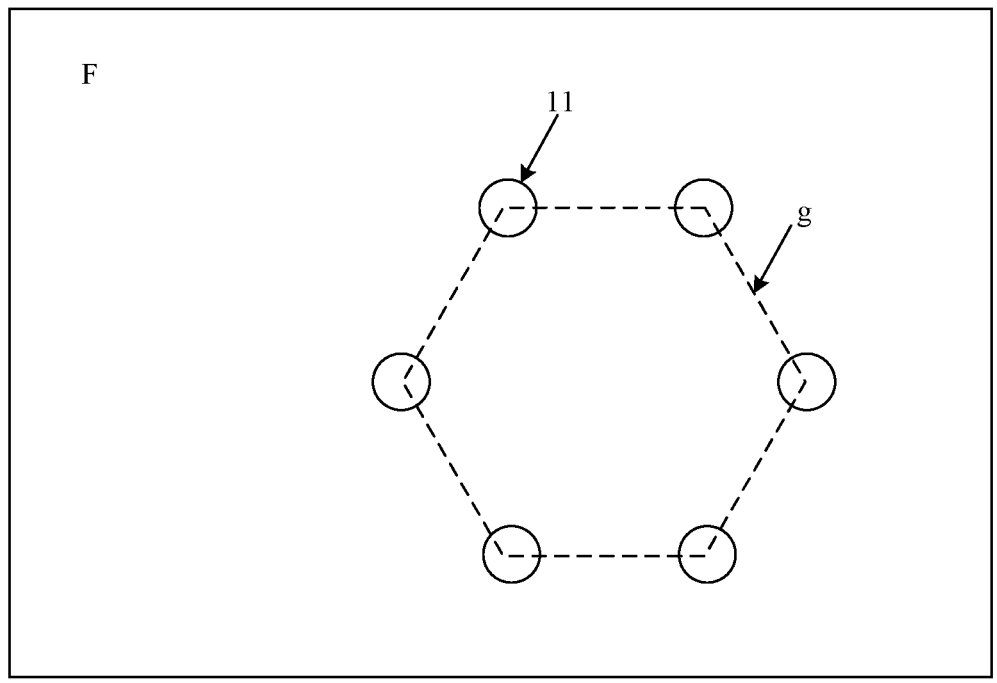
FIG. 4 is a structural diagram of another arrangement of a conductive member shown in FIG. 2.

As shown in FIG. 4, the number of the at least two conductive members 11 is six. The preset pattern g is a regular hexagon. The side length of the regular hexagon is a second preset length. When the number of conductive members is six and the conductive members are arranged to be the preset pattern, the probability that the touch panel incorrectly determines other touch points as the touch panel controllers provided in the embodiment of the present disclosure may be further reduced.

Arranging the orthogonal projections of the at least two conductive members on the placement surface F into a preset pattern may facilitate the touch panel to determine whether the touch panel controller provided in the embodiment of the present disclosure is located on the touch panel. The touch panel may further distinguish touch operations performed by a user in other manners from touch operations performed through the touch panel controller provided in the embodiment of the present disclosure.

Figure 5:
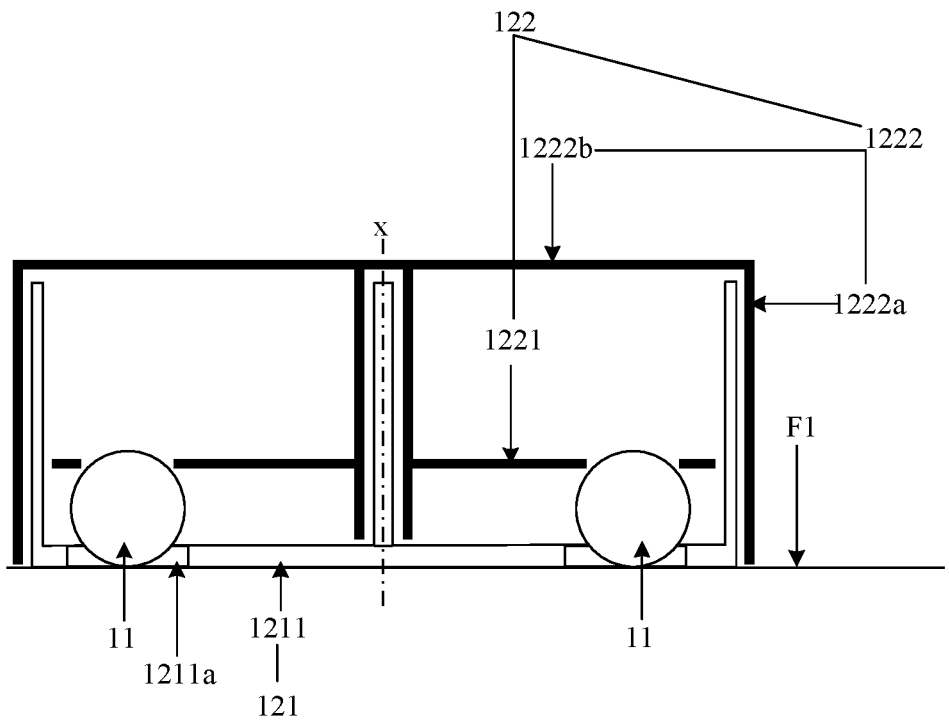
FIG. 5 is a structural diagram of another touch panel controller shown in an embodiment of the present disclosure.

As shown in FIG. 5, which is a structural diagram of another touch panel controller provided in an embodiment of the present disclosure. Each of the at least two conductive members 11 is in contact with a touch surface F1. The at least two conductive members 11 are capable of rolling on the touch surface F1 when moving circularly under the drive of the rotating component 122. When the conductive member directly contacts with the touch surface F1, the requirement of the sensitivity for the touch panel may be reduced. The conductive member's rolling over the touch surface (rather than sliding) may protect the touch surface, reducing the wear and tear on the touch surface caused by the conductive member.

In some embodiments, any one of the at least two conductive members 11 is spherical, cylindrical, circular truncated, or cone-shaped. Conductive members of these shapes are capable of rolling on the touch surface.

In some embodiments, each of the at least two conductive members 11 is spherical. The mounting component 122 includes a mounting plate 1221. At least two mounting holes are in the mounting plate 1221. The at least two conductive members are installed in the at least two mounting holes respectively.

Figure 6:
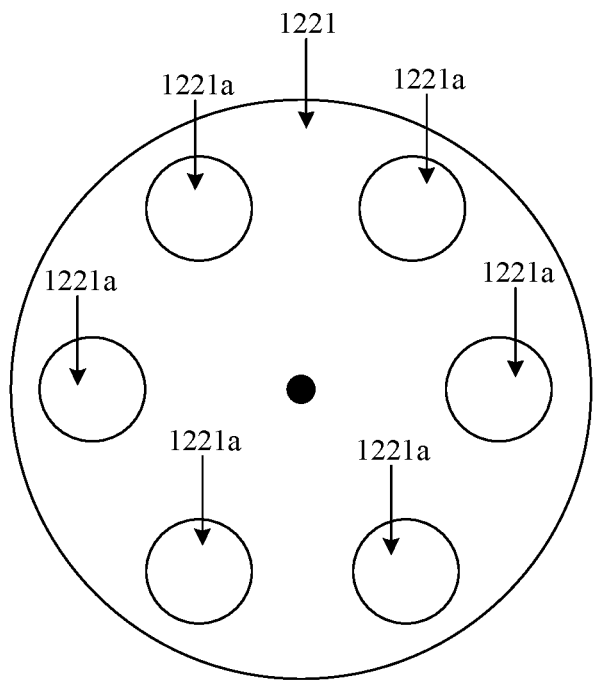
FIG. 6 is a top view of a mounting plate in the touch panel controller shown in FIG. 5.

As shown in FIG. 6, it is a top view of the mounting plate 1221 in the touch panel controller shown in FIG. 5. At least two mounting holes 1221a are in the mounting plate 1221. Spherical conductive members may be mounted in these mounting holes 1221a. FIG. 6 shows the case where the mounting holes and the mounting plate are both circular. The mounting holes and the mounting plate may also have other shapes, such as triangular or rectangular, etc., which is not limited in the embodiment of the present disclosure.

As shown in FIG. 5, the supporting component 121 includes a supporting plate 1211. An annular through hole 1211a is in the supporting plate 1211. A plate surface of the supporting plate 1211 (a plate surface near the touch panel) is a placement surface. The at least two conductive members 11 are capable of rolling on the touch surface F1 through the annular through hole 1211a when making a circular motion.

It should be noted that the placement surface may be a surface determined by the plate surface of the supporting plate. When the touch panel controller shown in FIG. 5 is used, the placement surface may be attached to the touch surface F1 of the touch panel.

Figure 7:
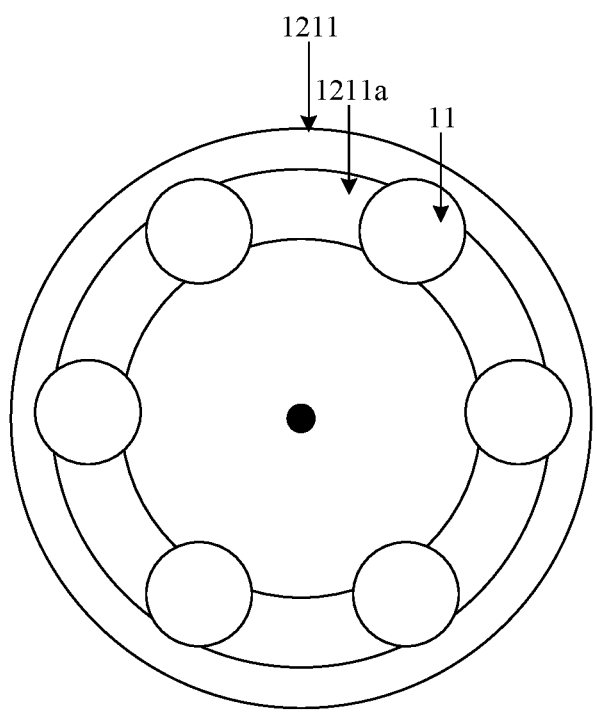
FIG. 7 is a top view of a supporting plate in the touch panel controller shown in FIG. 5.
Figure 8:
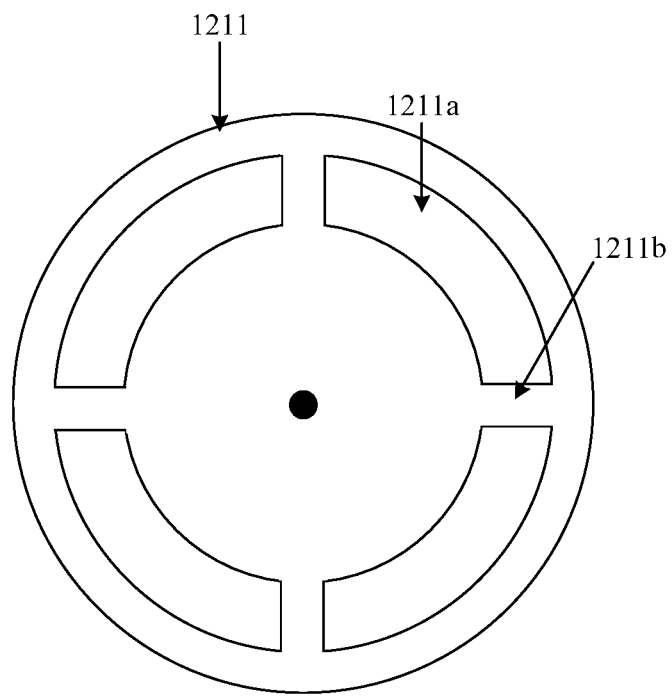
FIG. 8 is a top view of another supporting plate in the touch panel controller shown in FIG. 5.

As shown in FIG. 7, it is a top view of a supporting plate 1211 in the touch panel controller shown in FIG. 5. The supporting plate 1211 is provided with an annular through hole 1211a. The conductive member 11 may contact with the touch surface of the touch panel through the annular through hole 1211a and roll on the touch surface of the touch panel. In addition, as shown in FIG. 8, it is a top view of another supporting plate 1211 in the touch panel controller shown in FIG. 5. A connection bar 1211b is disposed between the inside and the outside supporting plates 1211 of the annular through hole 1211a. The connection bar 1211b may be configured to connect the inside and the outside supporting plates 1211 of the annular through hole.

In FIG. 5, the mounting component 122 further includes a rotating housing 1222 fixedly connected to the mounting plate 1221. The rotating housing includes a cylindrical outer wall 1222 and a top cover 1224. The cylindrical outer wall 1222 surrounds the mounting plate 1221. An axis of the cylindrical outer wall 1222 is parallel to an axis x of the mounting plate (FIG. 5 shows the case where the axis of the cylindrical outer wall coincides with the axis of the mounting plate, both of which are x, but this is not limited in the embodiment of the present disclosure. The axis x is also the axis of the entire touch panel controller). The top cover 1224 is arranged at an opening at one end of the cylindrical outer wall 1222 for sealing the opening.

In some embodiments, the diameter of each of the at least two conductive members 11 is greater than or equal to 3 mm. The distance between any two conductive members is greater than or equal to 3 mm. The diameter of the conductive member and the distance between any two conductive members are inversely proportional to the requirement of sensitivity for the touch panel. That is, the smaller the diameter of the conductive member is, the higher the requirement of the sensitivity for the touch panel is. The smaller the distance between any two conductive members is, the higher the requirement of the sensitivity for the touch panel is. When the diameter of each of the at least two conductive members 11 is greater than or equal to 3 mm and the distance between any two conductive members is greater than or equal to 3 mm, the touch panel controller provided in the embodiments of the present disclosure may be applied in various touch panels in the related art.

In some embodiments, the number of the at least two conductive members is less than or equal to the number of the touch points that the touch panel may identify. In this way, the situation where the touch panel cannot identify the touch panel controller provided in the embodiments of the present disclosure may be avoided.

In some embodiments, the supporting component 121 and the mounting component 122 are rotatably connected. The maximum static friction force between the supporting component 121 and the touch surface is greater than the maximum static friction force between the supporting component and the mounting component. In this way, when the mounting component rotates, the supporting component may provide sufficient resistance, so that the touch panel controller is relatively stationary, thereby improving the precision of the touch operation.

Figure 9:
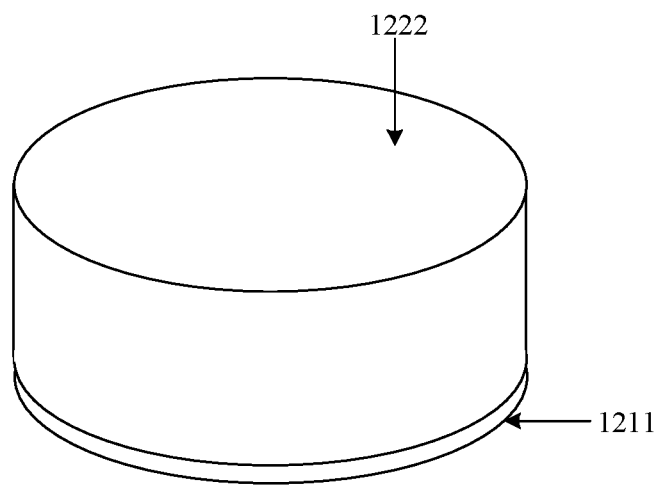
FIG. 9 is a perspective structural diagram of a touch panel controller shown in an embodiment of the present disclosure.

As shown in FIG. 9, it is a perspective structural diagram of a touch panel controller provided in an embodiment of the present disclosure. The rotating housing 1222 is in an upper part. The supporting plate 1211 is located in a lower part. A user may rotate the rotating housing 1222, or drag the whole touch panel controller to input different multi-point touch operations.

Since the touch panel controller provided in the embodiments of the present disclosure may not include a power supply, it may be applied to various types of capacitive touch panels and display panels including capacitive touch panels in the related art. Thus, the touch panel controller has good universality, high stability and long battery life.

In summary, the touch panel controller provided in the embodiment of the present disclosure uses a plurality of rotatable conductive members in the controller to input a multi-point touch operation such as rotation or multi-point sliding, which solves the problem in the related art that it is difficult for the stylus to accomplish multi-point touch operations and achieves an effect of performing a variety of multi-point touch operations through the controller.

Figure 10:
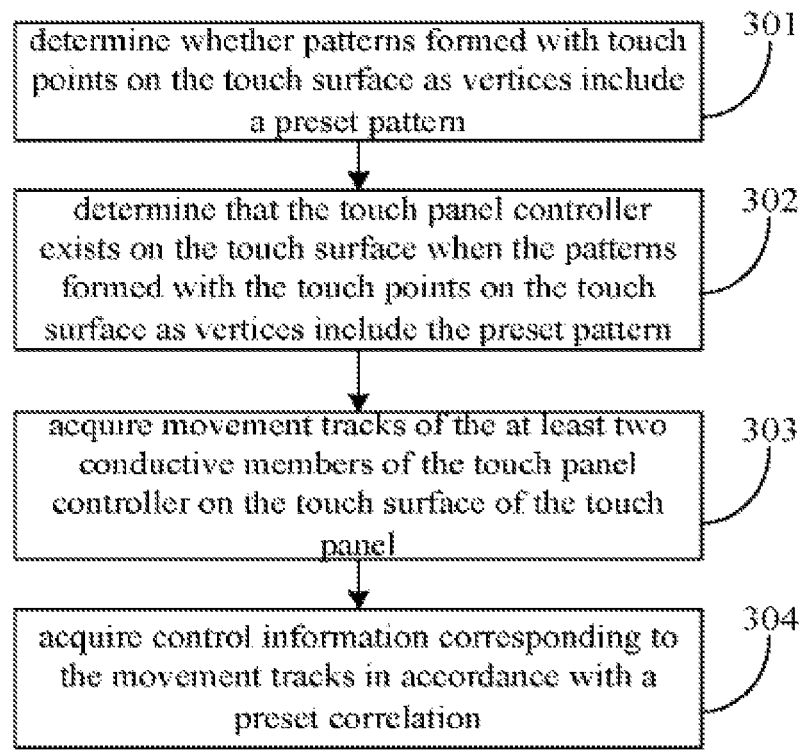
FIG. 10 is a flow chart of a method for acquiring control information shown in an embodiment of the present disclosure.

FIG. 10 is a flow chart of a control information acquisition method provided in accordance with an embodiment of the present disclosure. The method may be applied to a touch panel controlled by the touch panel controller provided in FIG. 1, FIG. 2, or FIG. 5. The method may include the following steps.

In step 301, whether patterns formed with touch points on the touch surface as vertices include a preset pattern is determined.

If the orthogonal projections of the at least two conductive members in the touch panel controller on the placement surface (For details about the placement surface, please refer to the embodiment shown in FIG. 1.) are vertices of the preset pattern, the touch panel may first determine whether the patterns formed with the touch points on the touch surface as the vertices include the preset pattern and then determine whether the touch panel controller exists on the touch surface accordingly. Taking the touch panel controller shown in FIG. 4 as an example, the orthogonal projections of the six conductive members 11 on the placement surface F are the vertices of a regular hexagon. If the touch panel controller is used to control the touch panel, the touch panel may determine whether a plurality of patterns formed with the touch points on the touch surface as vertices (the touch points triggered on the touch surface by the conductive members of the touch panel controller shown in FIG. 4 may form a plurality of patterns including a regular hexagon) include a regular hexagon. The touch points on the touch surface may include touch points triggered by the conductive members and/or touch points triggered by other objects such as a stylus or a finger.

In step 302, when the patterns formed with the touch points on the touch surface as vertices include the preset pattern, it is determined that the touch panel controller exists on the touch surface.

When the patterns formed with the touch points on the touch surface as vertices include the preset pattern, the touch panel may identify that the touch panel controller exists on the touch surface.

In step 303, movement tracks of the at least two conductive members of the touch panel controller on the touch surface of the touch panel are acquired.

The movement tracks of the at least two conductive members on the touch surface of the touch panel may be rotation tracks, linear tracks, or curved tracks.

In step 304, control information corresponding to the movement tracks are acquired in accordance with a preset correlation.

The preset correlation may record control information corresponding to various movement tracks of the touch panel controller. At different locations of the touch panel controller on the touch surface of the touch panel (the location of the touch panel controller on the touch surface may refer to the location of the orthogonal projection of the center of gravity of the touch panel controller on the touch surface), the movement tracks may also correspond to different control information. That is, the touch surface of the touch panel may be divided into different areas. Each track of the touch panel controller in different areas may correspond to different control information (the track may also correspond to the same control information, which is not limited in the embodiments of the present disclosure). Exemplarily, the correlation between the movement track and the control information may be shown in Table 1:

TABLE 1

| Track type | Area A | Area B | Area C |
| --- | --- | --- | --- |
| Rotation track | Partial rotation | Overall rotation | Zooming in or out |
| Linear track | Partial movement | Overall movement | Page switchover |

In Table 1, each movement track in different areas may correspond to different control information. The control information "partial rotation" may be used to indicate that the area where the touch panel controller is (area A in FIG. 11) rotates. The control information "overall rotation" may be used to indicate that the entire page displayed by the display panel rotates. Exemplarily, the control information corresponding to the rotation track in area C may be "zooming in or out". The counterclockwise rotation track and the clockwise rotation track may correspond to "zooming in" and "zooming out" respectively, which is not limited in this embodiment of the present disclosure.

Figure 11:
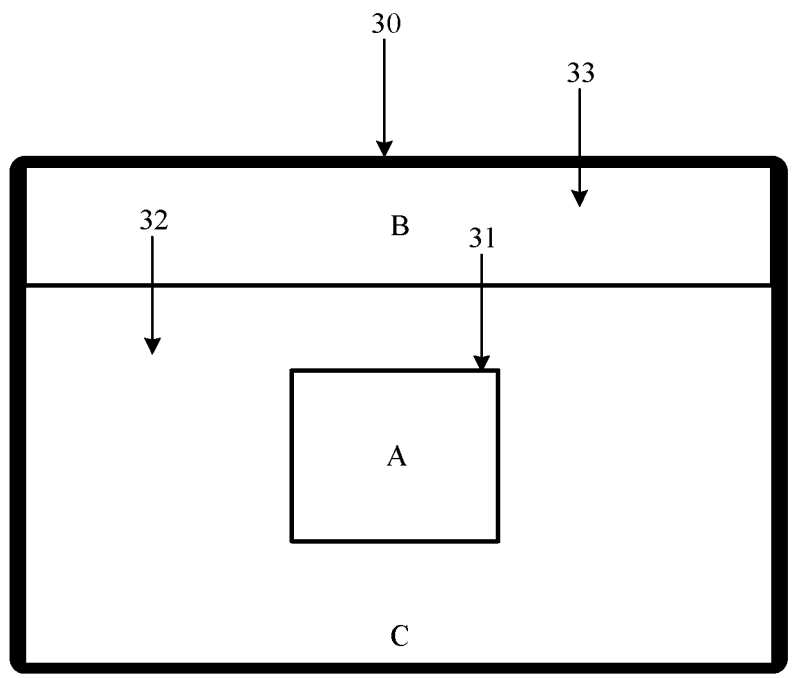
FIG. 11 is a diagram of division of the different areas shown in FIG. 10.

In this step, the area where the touch panel controller is located may be determined in accordance with the location of the touch panel controller on the touch surface. Then, the control information corresponding to the movement track of the touch panel controller may be determined in accordance with the area where the touch panel controller is located. The touch surface of the touch panel may be evenly divided into several areas. Alternatively, when the touch panel is located in the display panel (Here, the touch surface of the touch panel may overlap with the display area of the display panel), the touch surface of the touch panel is divided in accordance with the display content on the display panel. For example, as shown in FIG. 11, a pattern 31, a blank area 32, and a menu bar 33 are displayed in a display panel 30. The area that the pattern 31 occupies may be set as area A. The blank area 32 may be set as area C. The area where the menu bar 33 is located may be set as area B. As shown in Table 1, when the touch panel controller rotates in area A, the control information acquired by the touch panel is partial rotation, that is, the pattern 31 rotates. When the touch panel controller rotates in area B, the control information acquired by the touch panel may be overall rotation, that is, the entire page displayed by the display panel 30 rotates (the menu bar 33 may not rotate). When the touch panel controller rotates in area C, the control information acquired by the touch panel may be zooming in or out, that is, the display pattern 31 is zoomed in or zoomed out for display.

In summary, with the control information acquisition method provided in the embodiment of the present disclosure, a plurality of rotatable conductive members in the controller are used to input a multi-point touch operation such as rotation or multi-point sliding, which solves the problem in the related art that it is difficult for the stylus to accomplish multi-point touch operations and achieves an effect of performing a variety of multi-point touch operations through the controller.

In addition, there is further provided a touch display device in an embodiment of the present disclosure. The touch display device includes a touch panel controller and a touch display panel. The touch panel controller may include the touch panel controller shown in FIG. 1, FIG. 2 or FIG. 5. The touch display panel may include a touch panel and the touch display panel may be a capacitive touch display panel.

In the embodiment of the present disclosure, the touch display device includes one or more processors and a memory. The memory stores one or more programs configured to be executed by the one or more processors to perform the control information acquisition methods provided in the above embodiments.

The term "at least A and B" herein describes the correspondence of the corresponding objects, indicating three kinds of relationship. For example, "at least A and B" may be expressed as: A exists alone, A and B exist concurrently, and B exists alone. Similarly, "at least A, B and C" indicates seven kinds of relationship. For example, A exists alone, B exists alone, C exists alone, A and B exist concurrently, A and C exist concurrently, C and B exist concurrently, and A, B and C exist concurrently. Similarly, "at least A, B, C and D" indicates fifteen kinds of relationship. For example, A exists alone, B exists alone, C exists alone, D exists alone, A and B exist concurrently, A and C exist concurrently, A and D exist concurrently, C and B exist concurrently, D and B exist concurrently, C and D exist concurrently, A, B and C exist concurrently, A, B and D exist concurrently, A, C and D exist concurrently, B C and D exist concurrently, and A, B, C and D exist concurrently.

A computer readable storage medium, when instructions stored in the computer readable storage medium are executed by a processing component, causes the processing component to perform the control information acquisition methods in the abovementioned embodiments.

In the present disclosure, the term "first" and "second" are merely for description, and may not be understood to indicate or imply the relative importance. The term "plurality" indicates two or more, unless otherwise explicitly indicated.

Persons of ordinary skill in the art may understand that all or part of the steps described in the above embodiments may be completed through hardware, or through relevant hardware instructed by an application stored in a computer readable storage medium, such as read-only memory, disk or CD, etc.

The foregoing are only some embodiments of the present disclosure, and are not intended to limit the present disclosure. Within the spirit and principles of the disclosure, any modifications, equivalent substitutions, improvements, etc., are within the scope of protection of the present disclosure.

What is claimed is:

1. A touch panel controller for driving a touch panel, comprising:
    at least two conductive members and a rotating component, wherein
    the rotating component comprises a supporting component and a mounting component connected to each other, the mounting component is configured to have the at least two conductive members mounted thereon, and the at least two conductive members are movable circularly round an axis of the rotating component under the drive of the rotating component;
    one end of the supporting component is configured to determine a placement surface that is in contact with the touch panel, a distance between each of the at least two conductive members and the placement surface is less than a sensing distance, and the sensing distance is a distance at which a capacitance change caused by the conductive member is detectable by the touch panel; and
    orthogonal projections of the at least two conductive members on the placement surface are at least two point projections, and a preset pattern is formable with the at least two point projections as vertices.

2. The touch panel controller according to claim 1, wherein the number of the at least two conductive members is three, the preset pattern is an equilateral triangle, and a side length of the equilateral triangle is a first preset length.

3. The touch panel controller according to claim 1, wherein the number of the at least two conductive members is six, the preset pattern is a regular hexagon, and a side length of the regular hexagon is a second preset length.

4. The touch panel controller according to claim 1, wherein when the placement surface is in coplanar contact with a touch surface of the touch panel, each of the at least two conductive members is in contact with the touch surface, and
    the at least two conductive members are capable of rolling on the touch surface when moving circularly under the drive of the rotating component.

5. The touch panel controller according to claim 4, wherein any one of the at least two conductive members has a spherical shape, a cylindrical shape, a circular truncated cone shape, or a conical shape.

6. The touch panel controller according to claim 4, wherein each of the at least two conductive members is spherical,
    the mounting component comprises a mounting plate, at least two mounting holes are in the mounting plate, and the at least two conductive members are installed in the at least two mounting holes respectively; and
    the supporting component comprises a supporting plate, an annular through hole is in the supporting plate, a plate surface of the supporting plate is the placement surface, and the at least two conductive members are capable of rolling on the touch surface through the annular through hole when moving circularly.

7. The touch panel controller according to claim 6, wherein the mounting plate is a circular mounting plate, and
    the mounting component further comprises a rotating housing fixedly connected to the mounting plate, the rotating housing comprises a cylindrical outer wall and a top cover, the cylindrical outer wall surrounds the mounting plate, an axis of the cylindrical outer wall is parallel to an axis of the mounting plate, and the top cover is disposed at an opening at one end of the cylindrical outer wall for sealing the opening.

8. The touch panel controller according to claim 6, wherein a diameter of each of the at least two conductive members is greater than or equal to 3 mm, and a distance between any two conductive members is greater than or equal to 3 mm; and
the supporting plate comprises an inner supporting plate and an outer supporting plate, the inner supporting plate is inside the annular through hole, the outer supporting plate is outside the annular through hole, the annular through hole is provided with a connection bar, and the connection bar is used to connect the inner supporting plate and the outer supporting plate.

9. The touch panel controller of claim 1, wherein the number of the at least two conductive members is less than or equal to the number of touch points that the touch panel can identify.

10. The touch panel controller according to claim 1, wherein the supporting component and the mounting component are rotatably connected, and
a maximum static friction force between the supporting component and the touch surface of the touch panel is greater than a maximum static friction force between the supporting component and the mounting component.

11. A control information acquisition method for a touch panel controlled by a touch panel controller, wherein the touch panel controller comprises at least two conductive members and a rotating component, the rotating component comprises a supporting component and a mounting component connected to each other, the mounting component is configured to have the at least two conductive members mounted thereon, and the at least two conductive members are movable circularly round an axis of the rotating component under the drive of the rotating component; one end of the supporting component is configured to determine a placement surface that is in contact with the touch panel, a distance between each of the at least two conductive members and the placement surface is less than a sensing distance, and the sensing distance is a distance at which a capacitance change caused by the conductive member is detectable by the touch panel, and the orthogonal projections of the at least two conductive members on the placement surface are at least two point projections, a preset pattern is formable with the at least two point projections as vertices, and the method comprises:
determining whether patterns formed with touch points on the touch surface as a vertex comprises the preset pattern; and
determining that the touch panel controller exists on the touch surface when the patterns formed with the touch points on the touch surface as the vertex comprise the preset pattern;
acquiring movement tracks of the at least two conductive members of the touch panel controller on a touch surface of the touch panel; and
acquiring control information corresponding to the movement tracks according to a preset correlation.

12. A touch display device, comprising a touch display panel and a touch panel controller of claim 1, wherein the touch display panel comprises a touch panel.

13. The touch display device according to claim 12, wherein when the placement surface is in coplanar contact with a touch surface of the touch panel, each of the at least two conductive members is in contact with the touch surface of the touch panel, and the at least two conductive members are capable of rolling on the touch surface when moving circularly under the drive of the rotating component.

14. The touch display device according to claim 13, wherein any one of the at least two conductive members has a spherical shape, a cylindrical shape, a circular truncated cone shape, or a conical shape.

15. The touch display device according to claim 13, wherein each of the at least two conductive members is spherical,
the mounting component comprises a mounting plate, at least two mounting holes are in the mounting plate, and the at least two conductive members are installed in the at least two mounting holes respectively; and
the supporting component comprises a supporting plate, an annular through hole is in the supporting plate, a plate surface of the supporting plate is the placement surface, and the at least two conductive members are capable of rolling on the touch surface through the annular through hole when moving circularly.

16. The touch display device according to claim 15, wherein the mounting plate is a circular mounting plate, and
the mounting component further comprises a rotating housing fixedly connected to the mounting plate, the rotating housing comprises a cylindrical outer wall and a top cover, the cylindrical outer wall surrounds the mounting plate, an axis of the cylindrical outer wall is parallel to an axis of the mounting plate, and the top cover is disposed at an opening at one end of the cylindrical outer wall for sealing the opening.

17. The touch display device according to claim 15, wherein a diameter of each of the at least two conductive members is greater than or equal to 3 mm, and a distance between any two conductive members is greater than or equal to 3 mm; and
the supporting plate comprises an inner supporting plate and an outer supporting plate, the inner supporting plate is inside the annular through hole, the outer supporting plate is outside the annular through hole, the annular through hole is provided with a connection bar, and the connection bar is used to connect the inner supporting plate and the outer supporting plate.

18. A non-transitory computer-readable storage medium, comprising instructions stored therein, wherein the instructions, when executed by a processing component, cause the processing component to perform a control information acquisition method, the method comprising:
determining whether patterns formed with touch points on a touch surface as a vertex comprises a preset pattern; and
determining that a touch panel controller exists on the touch surface when the patterns formed with the touch points on the touch surface as a vertex comprise the preset pattern;
acquiring movement tracks of at least two conductive members of the touch panel controller on a touch surface of the touch panel; and
acquiring control information corresponding to the movement tracks according to a preset correlation,
wherein the touch panel controller comprises at least two conductive members and a rotating component, the rotating component comprises a supporting component and a mounting component connected to each other, the mounting component is configured to have the at least two conductive members mounted thereon, and the at least two conductive members are movable circularly round an axis of the rotating component under the drive of the rotating component; one end of the supporting component is configured to determine a placement surface that is in contact with the touch panel, a distance between each of the at least two conductive members and the placement surface is less than a sensing distance, and the sensing distance is a distance at which a capacitance change caused by the conductive member is detectable by the touch panel; orthogonal projections of the at least two conductive members on the placement surface are at least two point projections, and the preset pattern is formable with the at least two point projections as vertices.

\* \* \* \* \*